(12) United States Patent
Goodman et al.

(10) Patent No.: US 11,903,528 B1
(45) Date of Patent: Feb. 20, 2024

(54) GREASE ABSORBING UTENSIL

(71) Applicant: Karogen LLC, Delray Beach, FL (US)

(72) Inventors: Kathy E. Goodman, Delray Beach, FL (US); Robert Sunstone, North Palm Beach, FL (US)

(73) Assignee: KAROGEN LLC, Delray Beach, FL (US)

( * ) Notice: Subject to any disclaimer, the term of this patent is extended or adjusted under 35 U.S.C. 154(b) by 0 days.

(21) Appl. No.: 18/360,237

(22) Filed: Jul. 27, 2023

Related U.S. Application Data

(60) Provisional application No. 63/370,390, filed on Aug. 4, 2022.

(51) Int. Cl.
*A47J 43/28* (2006.01)

(52) U.S. Cl.
CPC ........... *A47J 43/284* (2013.01); *A47J 43/285* (2013.01); *A47J 43/28* (2013.01)

(58) Field of Classification Search
CPC ......... A47J 43/284; A47J 43/285; A47J 43/28
See application file for complete search history.

(56) References Cited

U.S. PATENT DOCUMENTS

| | | | | |
|---|---|---|---|---|
| 4,873,101 A | * | 10/1989 | Larson | B65D 77/225 426/123 |
| 4,942,811 A | * | 7/1990 | Kuhn | A47J 43/284 15/228 |
| 4,950,524 A | * | 8/1990 | Hacker | B65D 65/403 428/184 |
| 5,097,756 A | * | 3/1992 | Nolte | A47J 43/284 99/485 |
| 6,152,025 A | * | 11/2000 | Oien | A23L 5/273 99/496 |
| 6,274,229 B1 | * | 8/2001 | Weidner | B32B 27/10 219/733 |
| 6,449,990 B1 | * | 9/2002 | Kawajiri | D06F 39/10 68/17 R |
| 9,045,277 B1 | * | 6/2015 | Carll | A23L 5/15 |

* cited by examiner

*Primary Examiner* — Reginald Alexander
(74) *Attorney, Agent, or Firm* — Peter J. Van Bergen

(57) ABSTRACT

A grease absorbing utensil includes a pad that includes a set of layers and a handle coupled to the pad. Each layer is made from at least one flexible material that is lipophilic and biodegradable. The handle is lipophilic and biodegradable.

18 Claims, 8 Drawing Sheets

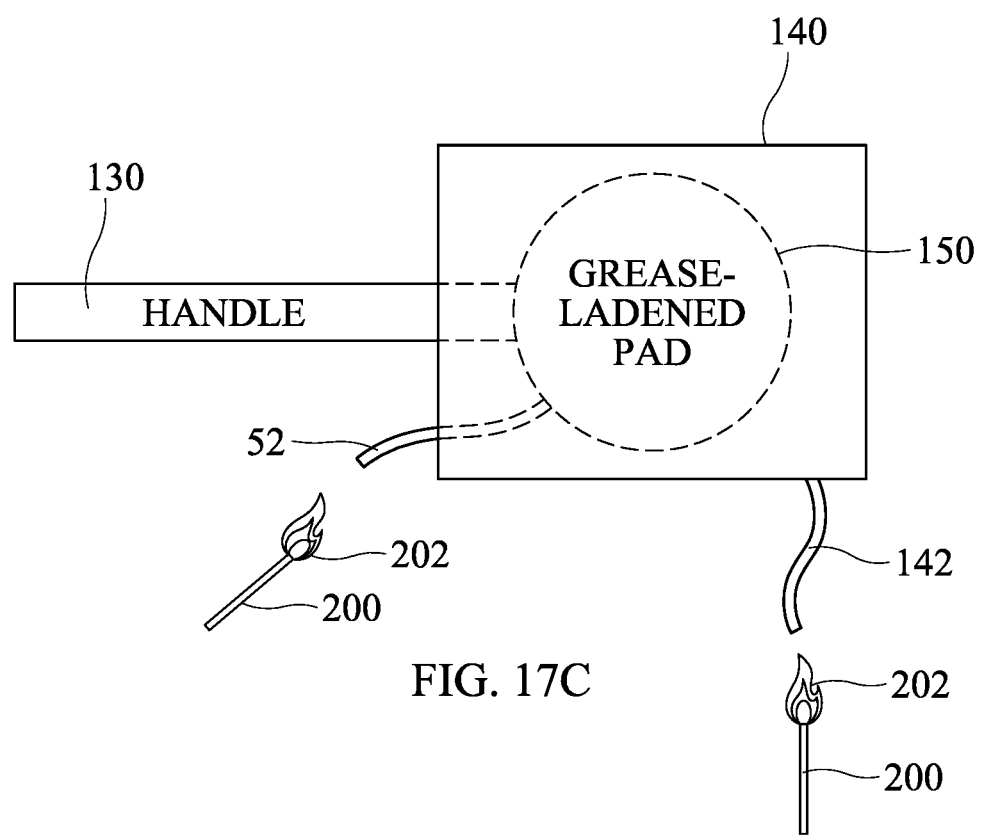

GREASE ABSORBING UTENSIL

Pursuant to 35 U.S.C. § 119, the benefit of priority from provisional application 63/370,390, with a filing date of Aug. 4, 2022, is claimed for this non-provisional application.

FIELD OF THE DISCLOSURE

This disclosure relates generally to grease absorption, and more particularly to methods and systems for absorbing grease such as kitchen grease using a biodegradable utensil.

BACKGROUND

The collection of grease or oil is generally a messy proposition. For example, hot grease or oil created or used when cooking is often poured down a drain or into some glass or metal container. When poured down a drain, the grease/oil becomes a contaminant in a wastewater system and may damage the environment. In addition, grease/oil poured down a drain tends to coat and solidify on plumbing pipes that may ultimately lead to clogged pipes. When poured into a container, the container and grease/oil generally end up in a landfill to become a long-lasting contaminant.

SUMMARY

Accordingly, it is an object of the present disclosure to describe methods and systems for absorbing grease or oil.

Another object of the present disclosure is to describe methods and systems for absorbing cooking grease or oil using an environmentally-friendly utensil.

Still another object of the present disclosure is to describe methods and systems for absorbing cooking grease or oil that allows the absorbed grease/oil to be stored and re-purposed.

Other objects and advantages of the methods and systems described herein will become more obvious hereinafter in the specification and drawings.

In accordance with methods and systems described herein, a grease absorbing utensil includes a pad that includes a set of layers and a handle coupled to the pad. Each layer is made from at least one flexible material that is lipophilic and biodegradable. The handle is made from a material that is lipophilic and biodegradable. In some embodiments, pieces of plant-based material are disposed between at least two of the layers.

BRIEF DESCRIPTION OF THE DRAWINGS

Other objects, features and advantages of the methods and systems described in the present disclosure will become apparent upon reference to the following description of the preferred embodiments and to the drawings, wherein corresponding reference characters indicate corresponding parts throughout the several views of the drawings and wherein:

FIG. 17C illustrates yet another embodiment of a method of starting a fire performed by igniting a grease-ladened utensil in accordance with various aspects as described herein.

DETAILED DESCRIPTION

The present disclosure will describe methods and systems for absorbing grease or oil in an efficient, economical, and environmentally-friendly manner. By way of example, the methods and systems described herein may be used to absorb a variety of grease or oils that may be generated or used in food preparation and cooking. In general, the grease or oil to be absorbed is melted or in a liquid (or near liquid) state. For simplicity, the term "grease" will be used hereinafter and will be assumed to include oil or other types of greasy liquid substances that are not water soluble.

Figure 1:
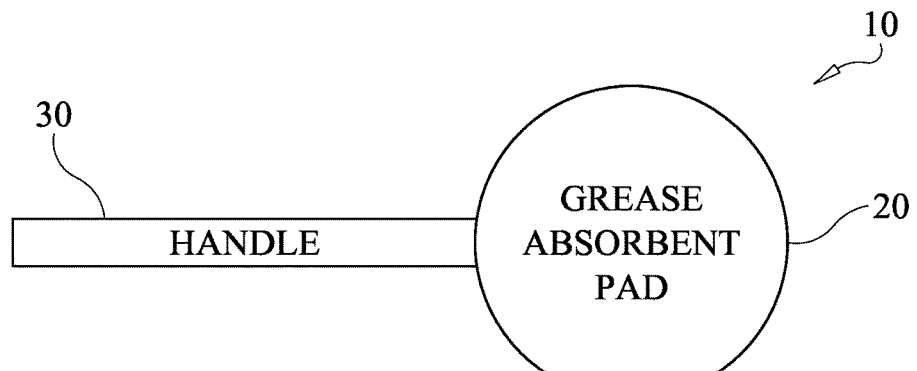
FIG. 1 illustrates a schematic view of one embodiment of a grease absorbing utensil in accordance with various aspects as described herein.

Referring now to the drawings and more particularly to FIG. 1, a grease absorbing utensil is illustrated schematically and is referenced generally by numeral 10. Utensil 10 includes a grease absorbent pad 20 and a handle 30 coupled to pad 20. In general, pad 20 is a flexible structure that is both lipophilic and biodegradable. The lipophilic nature of pad 20 allows it to absorb a variety of lipids (i.e., grease or fatty oils that are insoluble in water). The biodegradable nature of pad 20 assures that pad 20 will break down chemically over time without having a negative impact on the environment. A variety of configurations and constructions for pad 20 may be used without departing from the scope of the present disclosure. Several non-limiting embodiments of pad 20 will be described further below. The shape (e.g., round, triangular, rectangular, etc.) and size of pad 20 are not limitations of the systems and methods described herein. Handle 30 may be a rigid or flexible handle that may be both lipophilic and biodegradable. Several non-limiting embodiments of handle 30 will be described further below.

Figure 2:
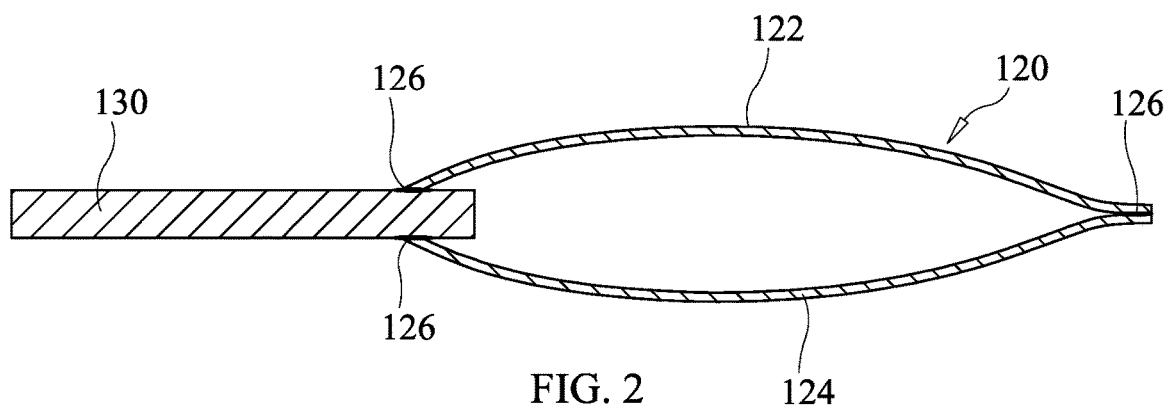
FIG. 2 illustrates a cross-sectional view of one embodiment of a grease absorbing utensil in accordance with various aspects as described herein.

Referring not to FIG. 2, a cross-sectional view of a grease absorbing utensil is shown and is referenced generally by numeral 100. Utensil 100 includes a pad 120 and a handle 130 coupled to pad 120. In the illustrated example, pad 120 includes separate layers 122 and 124 made from a flexible lipophilic and biodegradable material. For example, such flexible materials may be paper-based, made from 100% renewable plant fibers, etc., without departing from the scope of the present disclosure. Layers 122 and 124 may also include tear-resistant attributes. Layers 122 and 124 are joined at the periphery of pad 120 as indicated by numeral 126. Joins 126 may be achieved by one of more of stitching, gluing, fusing, folding, etc. Coupled to pad 120 is handle 130 where such coupling may occur at and/or using joins 126 as illustrated. In some embodiments, handle 130 may be made from wood, bamboo, or cardboard. The shape of handle 130 may be a cylindrical or shaped rod, a flat stick, or other shapes/configurations without departing from the scope of the present disclosure. In some embodiments and as will be described further below, handle 130 may extend all the way through pad 120, may be configured for ready insertion into and retention by pad 120, and/or may have holes to enhance the handle's grease absorbing capabilities. In some embodiments, handle 130 may be made from flammable materials if the post-use utensil is to be used as a fire starter as will be explained further below.

Figure 3:
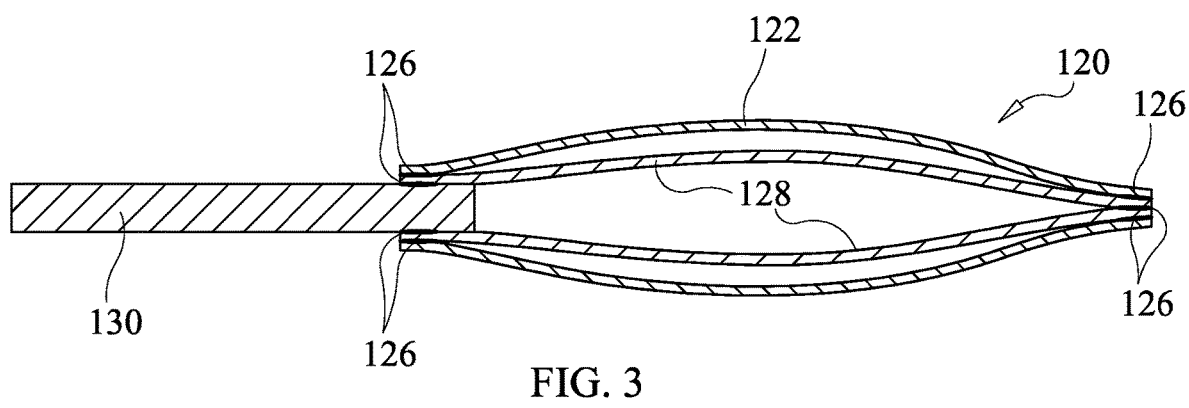
FIG. 3 illustrates a cross-sectional view of another embodiment of a grease absorbing utensil in accordance with various aspects as described herein.

In some embodiments, the utensil's pad may include internal layers as illustrated in FIG. 3 where pad 120 has outer layers 122 and 124, and has one or more inner layers 128 separated from one another and from outer layers 122 and 124. All layers 122, 124 and 128 are joined at the periphery of pad 120 as indicated by joins 126.

In some embodiments, the utensil's pad may include pieces or particles of a lipophilic material between at least two of the pad's layers. The pieces or particles may be plant-based materials such as, but not limited to, wood, cotton, dried/ground nut shells, citrus peels, and mixtures thereof. The pieces or particles may be present as a loose fill such that interstitial regions are formed between the pieces or particles. When the pieces or particles are made from wood, they may take the form of sawdust, wood chips, wood shavings, and mixtures thereof. The sizes and/or shapes of the pieces or particles used in a pad may be approximately the same or varied throughout the pad.

Figure 4:
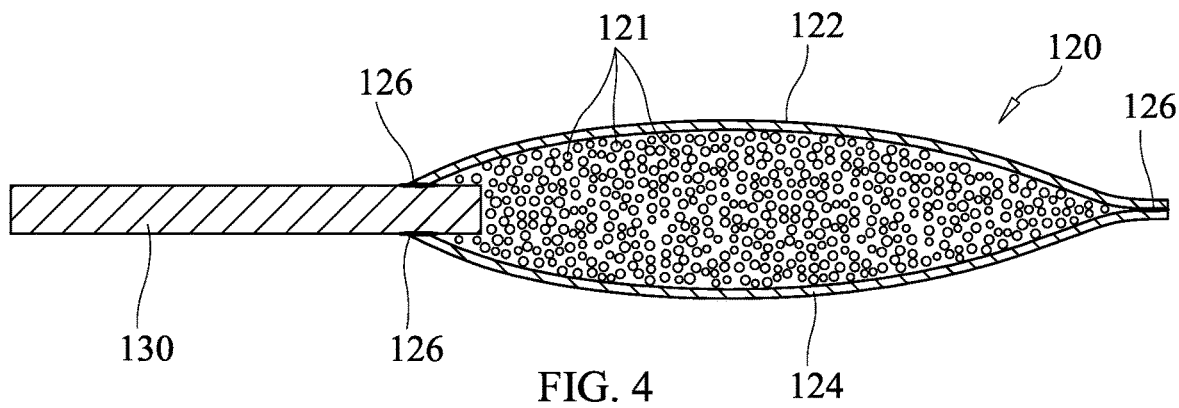
FIG. 4 illustrates a cross-sectional view of another embodiment of a grease absorbing utensil that includes cellulose-based fill in accordance with various aspects as described herein.
Figure 5:
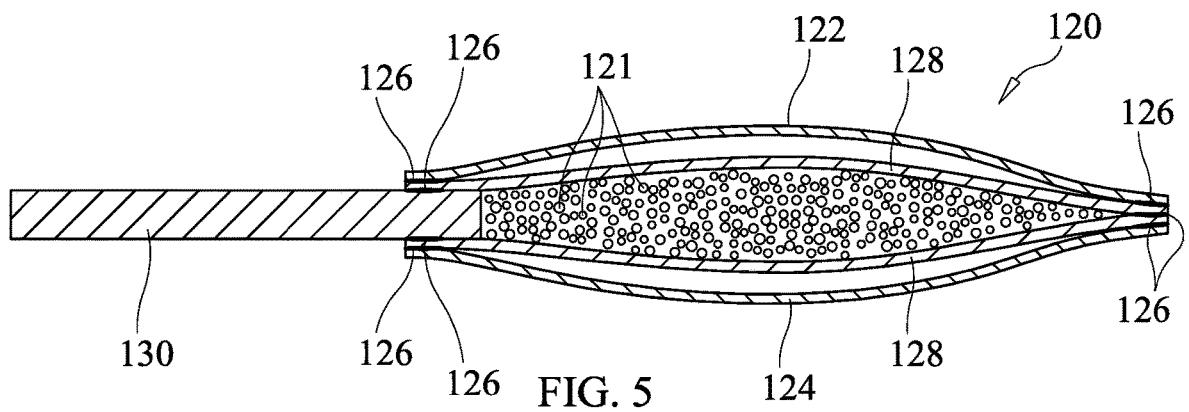
FIG. 5 illustrates a cross-sectional view of another embodiment of a grease absorbing utensil that includes cellulose-based fill in accordance with various aspects as described herein.
Figure 6:
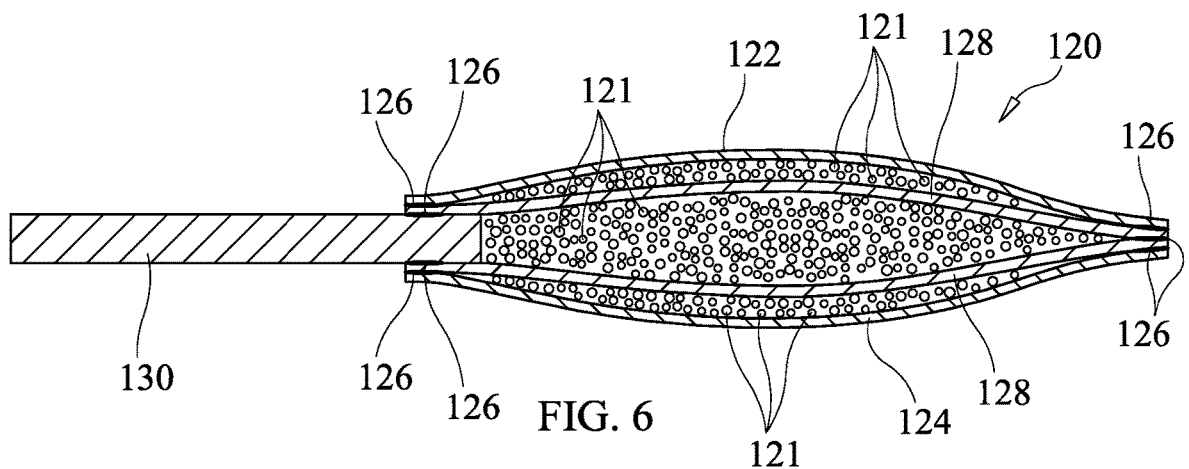
FIG. 6 illustrates a cross-sectional view of another embodiment of a grease absorbing utensil that includes cellulose-based fill in accordance with various aspects as described herein.

Several non-limiting embodiments of grease absorbing utensils incorporating lipophilic materials in accordance with the present disclosure are illustrated in FIGS. 4-6. In FIG. 4, pad 120 having layers 122 and 124 further includes a loose arrangement of particles 121 made from, for example, wood or any of the other material possibilities mentioned above. In FIG. 5, pad 120 having outer layers 122/124 and two inner layers 128 further includes a loose arrangement of particles 121 (e.g., made of wood) disposed between layers 128. In FIG. 6, pad 120 having outer layers 122/124 and two inner layers 128 further includes a loose arrangement of particles 121 (e.g., made of wood, etc.) disposed between all adjacent layers of pad 120.

Figure 7:
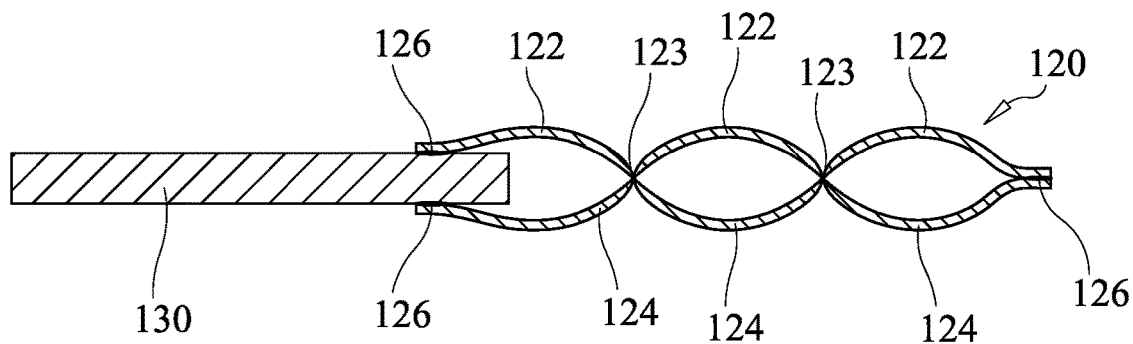
FIG. 7 illustrates a cross-sectional view of another embodiment of a grease absorbing utensil that includes a quilted pad in accordance with various aspects as described herein.
Figure 8:
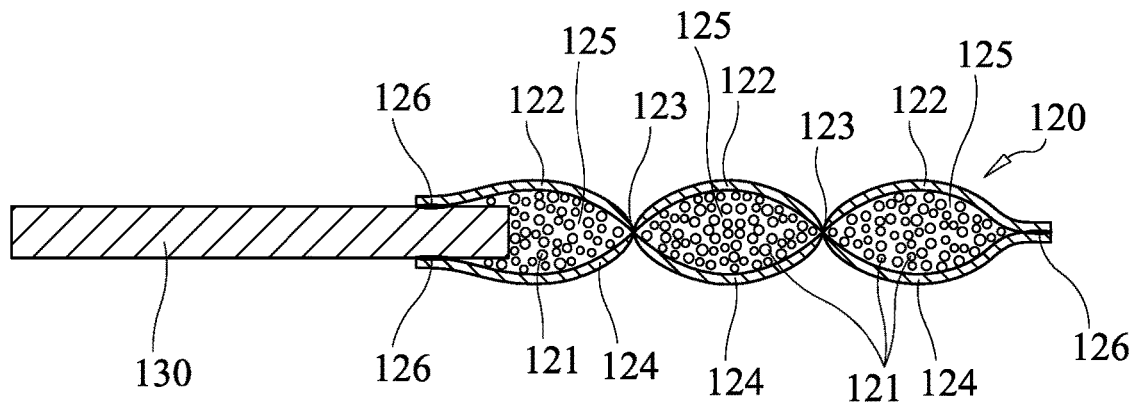
FIG. 8 illustrates a cross-sectional view of another embodiment of a grease absorbing utensil that includes a quilted pad having cellulose-based fill in accordance with various aspects as described herein.
Figure 9:
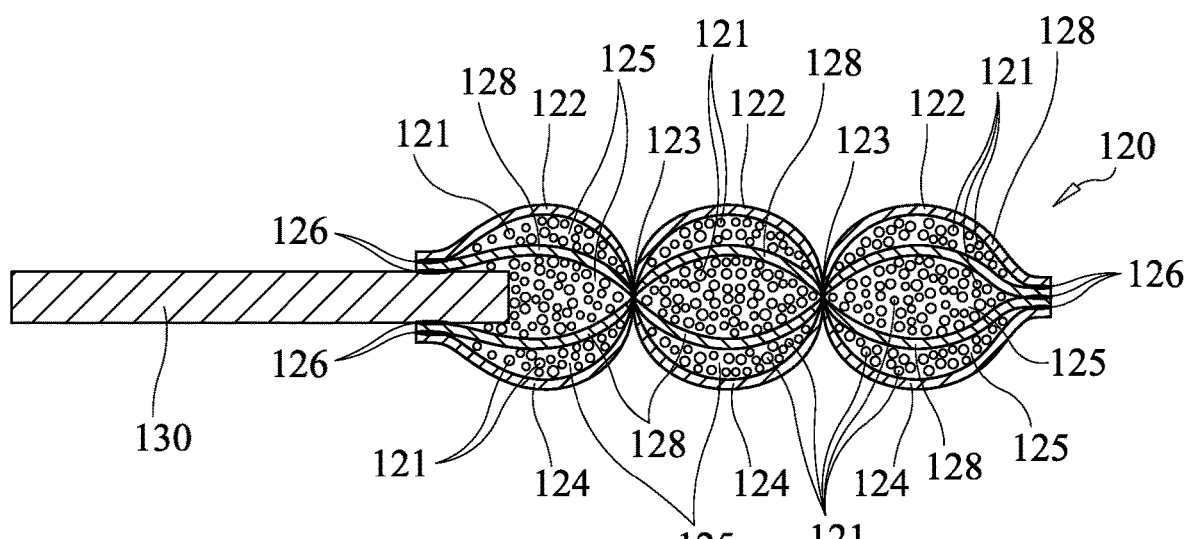
FIG. 9 illustrates a cross-sectional view of another embodiment of a grease absorbing utensil that includes a quilted pad having cellulose-based fill in accordance with various aspects as described herein.

In some embodiments, a pad of a utensil in accordance with the present disclosure may be quilted to improve its structural integrity and/or maintain the pad's distribution of lipophilic particles. Several non-limiting embodiments of grease absorbing utensils having a quilted pad are illustrated in FIGS. 7-9. In FIG. 7, pad 120 having just layers 122 and 124 has quilting joins 123 coupling portions of layer 122 to layer 124 with resulting pockets 125 being created between the layers. Quilting joins 123 may be achieved using one or more of stitches, glue, fusing, etc. The number and/or pattern of quilting joins 123 are not limitations of the present methods and systems. In FIG. 8, pad 120 further includes loose arrangements of particles 121 (e.g., made of wood, etc.) in each of pockets 125 created by quilting joins 123. In FIG. 9, pad 120 includes outer layers 122/124 and two inner layers 128, and further includes loose arrangements of particles 121 (e.g., made of wood, etc.) in each of pockets 125 created by quilting joins 123.

Figure 10:
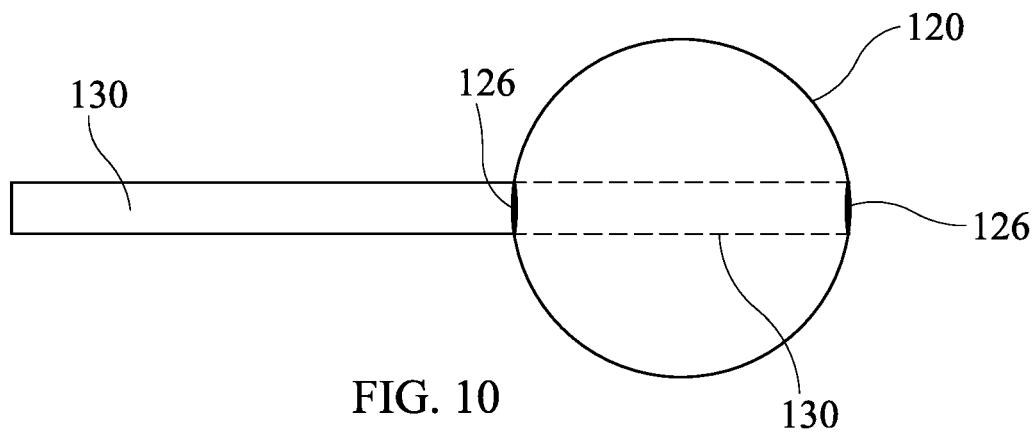
FIG. 10 illustrates a plan view of another embodiment of a grease absorbing utensil having a handle extending all the way through the utensil's pad in accordance with various aspects as described herein.
Figure 11:
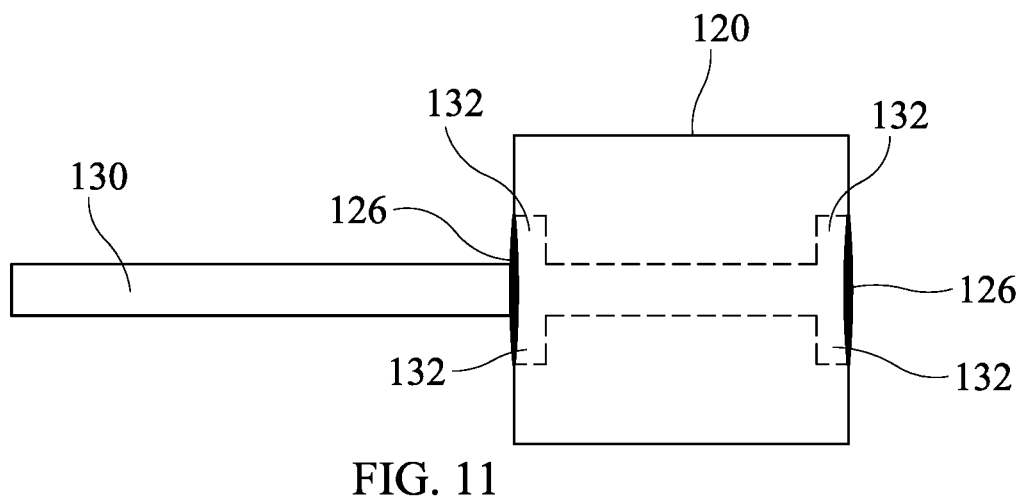
FIG. 11 illustrates a plan view of another embodiment of a grease absorbing utensil having a handle extending all the way through the utensil's pad in accordance with various aspects as described herein.

As mentioned above, a grease absorbing utensil in accordance with the present disclosure may include a handle that extends all the way through the utensil's pad. Such embodiments may provide additional stability for the utensil, especially after the utensil's pad has absorbed a quantity of grease. One such embodiment is illustrated in FIG. 10 where handle 130 extends fully through pad 120 and is coupled to opposing sides of pad 120 at joins 126. In some embodiments, the utensil's handle may be configured to provide more area for attachment to the utensil's pad. For example and with reference to FIG. 11, handle 130 includes wings 132 that align with the periphery of pad 120 to thereby increase the amount of attachment length and/or area for joins 126.

Figure 12:
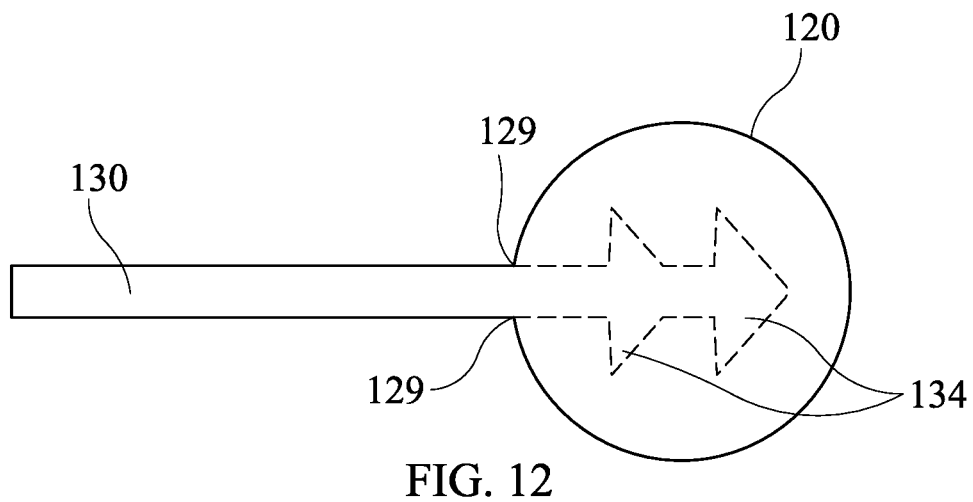
FIG. 12 illustrates a plan view of another embodiment of a grease absorbing utensil having a handle configured for insertion and retention in the utensil's pad in accordance with various aspects as described herein.

In some embodiments, the utensil's handle may be configured for both ready insertion into the utensil's pad and retention in the pad. For example and with reference to FIG. 12, handle 130 may include arrow-shaped wings 134 that facilitate insertion into a hole 129 in pad 120. Hole 129 and wings 134 may also be sized and shaped such that they cooperate to aid in the retention of handle 130 in pad 120. In such cases, the utensil may be packaged compactly with its pad and handle placed side-by-side.

Figure 13:
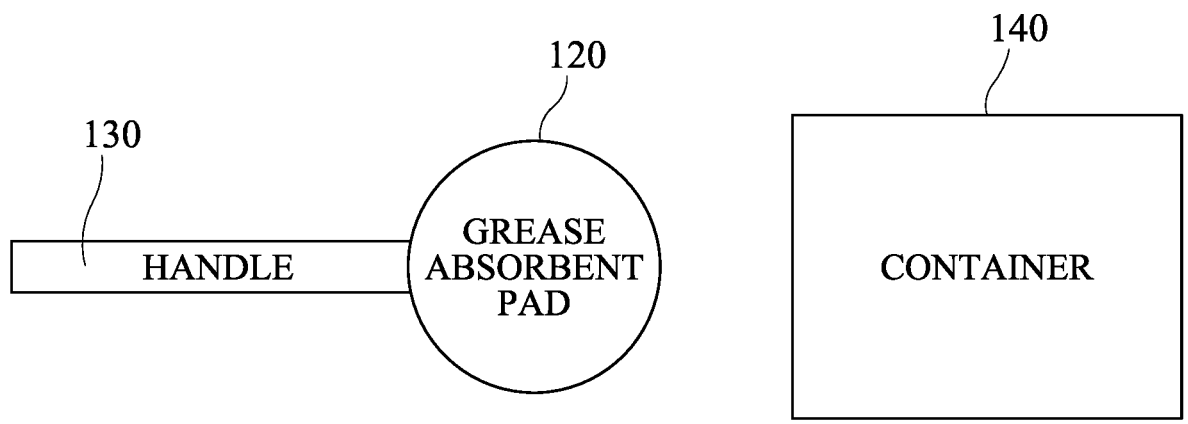
FIG. 13 illustrates a schematic view of another embodiment of a grease absorbing utensil that includes a storage container in accordance with various aspects as described herein.
Figure 14:
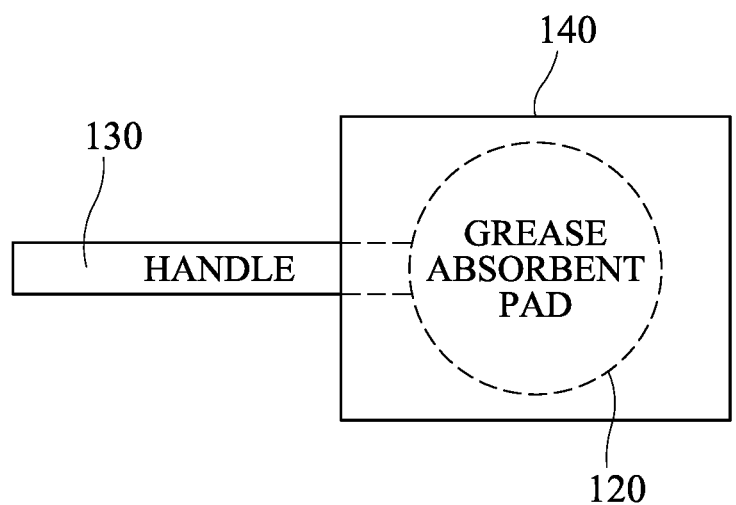
FIG. 14 illustrates a schematic view of another embodiment of a grease absorbing utensil in an envelope-like storage container in accordance with various aspects as described herein.

The grease absorbing utensil described herein may also include a container that provides for both before-use storage and after-use storage of the utensil. Before-use storage may protect the utensil's pad during pre-use handling, while after-use storage may simplify the handling of the pad after it has absorbed grease. Referring now to FIGS. 13 and 14, a container 140 is operable to store utensil 100. If container 140 is to be used for disposal of a used utensil 100 (i.e., pad 120 is saturated or ladened with grease), container 140 may be made from a biodegradable material. In some embodiments, container 140 may be configured as an envelope made from, for example, wax paper or lined with a waxy material so that grease cannot seep through the walls of container 140. In some embodiments, container 140 may be made from materials such as pulverized nut shells, citrus peels, dried herbs, etc. In some embodiments and as illustrated in FIG. 14, container 140 may be configured to receive pad 120 therein, while allowing at least a portion of handle 130 to protrude from container 140 to facilitate pre and post-use handling.

Figure 15:
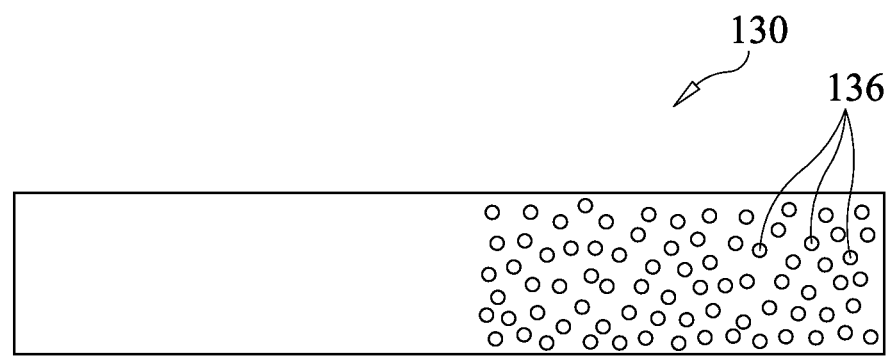
FIG. 15 illustrates an isolated plan view of another embodiment of a handle having holes in accordance with various aspects as described herein.

In some embodiments and as illustrated in FIG. 15, some or all of a handle 130 may include holes 136 to facilitate flexibility of the handle and/or enhance the handle's ability to absorb grease. For example, when handle 130 is made of wood, bamboo, cardboard, etc., inclusion of holes 136 at least in the portion thereof enclosed within a pad (not shown in FIG. 15) as described above, the exposed wood created by each hole 136 provides additional surface area for grease absorption. The size and shape of a handle having holes may also be configured to have any of the other above-described features without departing from the scope of the present disclosure.

Figure 16:
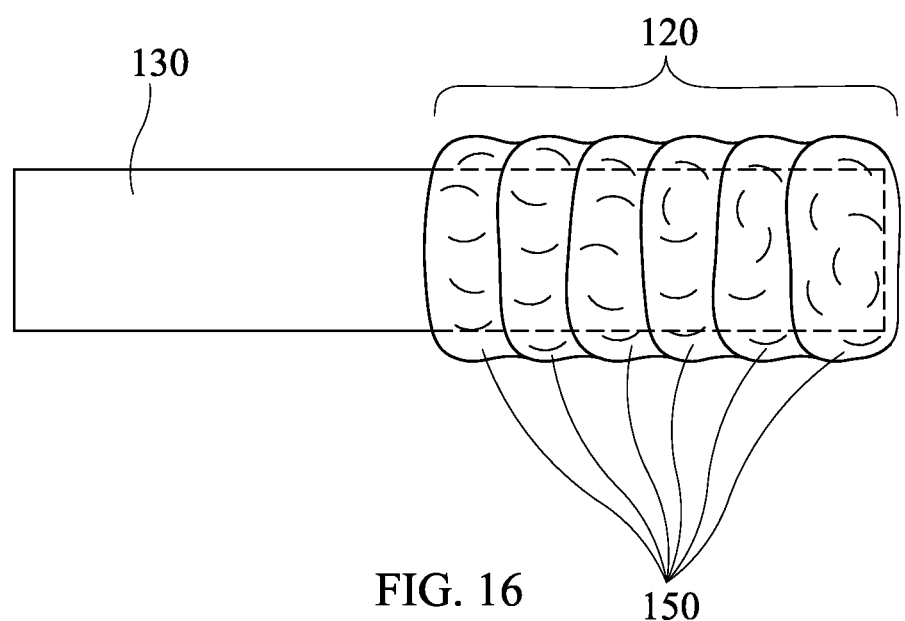
FIG. 16 illustrates a side view of another embodiment of a grease absorbing utensil having the outer portion of its pad formed by a wrap in accordance with various aspects as described herein.

In some embodiments, a utensil in accordance with the present disclosure may have its pad formed by a wrap of one or more lipophilic and biodegradable materials on the utensil's handle. For example and with reference to FIG. 16, a handle 130 configured in any of the ways described or contemplated herein is wrapped with a lipophilic and biodegradable wrap 150 (e.g., cotton gauze) to form pad 120. As in the previously-described examples, particles of lipophilic and biodegradable materials may be contained within pad 120 as constrained by wrap 150.

In some embodiments, the grease absorbing utensil in accordance with the present disclosure may incorporate wood particles of the type that are used in the grilling or smoking of foods. Such woods may include, but are not limited to, mesquite, hickory, oak, maple, pecan, alder, fruitwoods, and mixtures thereof.

In use of any of the grease absorbing utensils described herein, a user grasps the utensil's handle and wipes the utensil's pad over a surface (e.g., cook pan, stovetop, counter, floor, etc.) having grease or oil that is to be collected. The utensil with its resulting grease-saturated pad may be disposed of directly or via a container as described previously herein. In either case, the utensil and (if used) its container are biodegradable such that there will be minimal environmental impacts. In some cases, a user may re-purpose a utensil with its grease-saturated pad as a fire starter. That is, the lipophilic nature of the utensil's pad and handle allow it to be readily used as a tool to start a fire. Indeed, the handle's lipophilic nature allows it to wick absorbed grease from the utensil's pad along the length of the handle such that the handle may serve as a fuse for safe ignition of the grease-saturated pad. When the grease-saturated pad includes one or more of the above-mentioned grilling or smoking woods, the utensil's handle and grease-saturated pad also contributes to the flavoring of a cooked or smoked food.

Figure 17A:
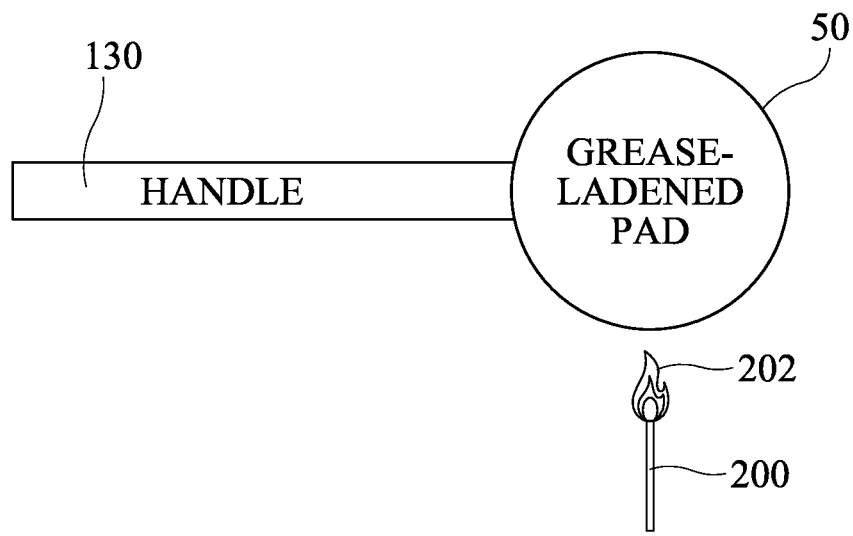
FIG. 17A illustrates one embodiment of a method of starting a fire performed by igniting a grease-ladened utensil in accordance with various aspects as described herein.
Figure 17B:
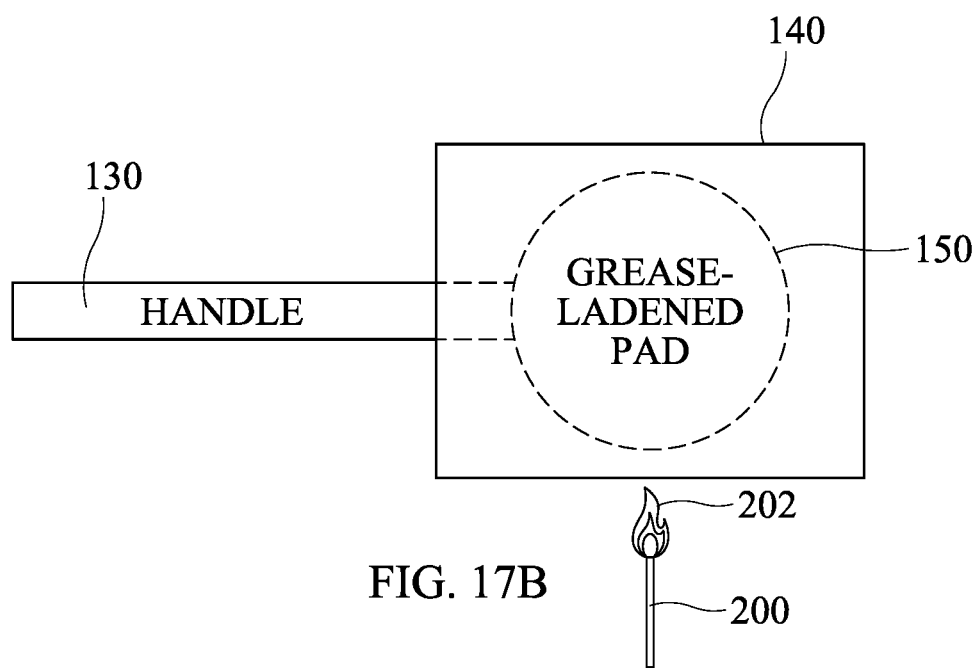
FIG. 17B illustrates another embodiment of a method of starting a fire performed by igniting a grease-ladened utensil in accordance with various aspects as described herein.

As mentioned above, a grease-ladened pad as described herein may be used as a fire starter ignited by a lit match, lighter, etc. For example and as illustrated in FIG. 17A, a grease-ladened pad 50 (i.e., any of the pads described herein that has already been used to absorb grease) may be lit directly by the flame 202 of a match 200. In some embodiments and as illustrated in FIG. 17B, a grease-ladened pad 50 disposed in a container 140 is ignited indirectly by the flame 202 of a match 200 used to ignite container 140. In some embodiments and as illustrated in FIG. 17C, a grease-ladened pad 50 is ignited directly via a fuse 52 extending from pad 50 and/or indirectly via a fuse 142 extending from container 140.

Although the methods and systems presented herein have been described for specific embodiments thereof, there are numerous variations and modifications that will be readily apparent to those skilled in the art in light of the above teachings. For example, in some embodiments, the utensil's handle may be positioned along an edge of the grease-absorbing pad thereby allowing the pad to be rolled up with the handle at the center of such a roll. The rolled utensil may be packaged for pre-use handling as well as post-use handling. The post-use rolled utensil presents a convenient package for use as a fire starter as described above. It is therefore to be understood that, within the scope of the appended claims, the methods and systems presented herein may be practiced other than as specifically described.

What is claimed as new and desired to be secured by Letters Patent of the United States is:

1. A utensil, comprising:
   a pad including a set of layers;
   a handle extending into and coupled to opposing edges of said pad, said handle being lipophilic and biodegradable;
   each of said layers made from at least one flexible material that is lipophilic and biodegradable; and
   loose pieces of only lipophilic and biodegradable materials disposed between at least two of said layers.

2. The utensil of claim 1, wherein said loose pieces include plant-based materials.

3. The utensil of claim 1, wherein said loose pieces and said handle are selected from the group consisting of wood, bamboo, and cardboard.

4. The utensil of claim 1, further comprising a container operable to store said pad, said container made from a biodegradable material.

5. The utensil of claim 1, wherein said pad is quilted.

6. The utensil of claim 1, further comprising a set of holes in a portion of said handle that is encased by said pad.

7. The utensil of claim 1, wherein said layers comprise a wrap encasing a portion of said handle.

8. A utensil, comprising:
   a pad including a set of flexible layers;
   loose pieces of only biodegradable wood selected from the group consisting of mesquite, hickory, oak, maple, pecan, alder, fruitwoods, and mixtures thereof, said loose pieces being disposed between at least two of said flexible layers;
   a handle extending into and coupled to opposing edges of said pad, said handle being lipophilic and biodegradable; and
   each of said flexible layers made from at least one flexible material that is lipophilic and biodegradable.

9. The utensil of claim 8, wherein said handle is selected from the group consisting of wood, bamboo, and cardboard.

10. The utensil of claim 8, further comprising an envelope operable to store said pad, said envelope made from a biodegradable material.

11. The utensil of claim 8, wherein said pad is quilted.

12. The utensil of claim 8, further comprising a set of holes in a portion of said handle that is encased by said pad.

13. The utensil of claim 8, wherein said flexible layers comprise a wrap encasing a portion of said handle.

14. A utensil, comprising:
    a pad including a set of flexible layers;

a loose arrangement of only biodegradable particles disposed between at least two of said flexible layers, said biodegradable particles comprising wood particles selected from the group consisting of mesquite, hickory, oak, maple, pecan, alder, fruitwoods, and mixtures thereof;

a wood handle extending into and coupled to opposing edges of said pad; and each of said flexible layers made from at least one flexible material that is lipophilic and biodegradable.

15. The utensil of claim 14, further comprising an envelope operable to store said pad with said wood handle extending from said envelope, said envelope made from a biodegradable material.

16. The utensil of claim 14, wherein said pad is quilted.

17. The utensil of claim 14, further comprising a set of holes in a portion of said wood handle that is encased by said pad.

18. The utensil of claim 14, wherein said flexible layers comprise a wrap encasing a portion of said wood handle.

* * * * *